United States Patent [19]

Maloof

[11] 3,867,612

[45] Feb. 18, 1975

[54] FILM VIEWER DISPLAY ENCODER

[75] Inventor: Samuel Maloof, Westwood, Mass.

[73] Assignee: The United States of America as represented by the Department of the Navy, Washington, D.C.

[22] Filed: Nov. 8, 1972

[21] Appl. No.: 304,702

[52] U.S. Cl....235/61.7 R, 235/61.11 E, 235/61.1 R, 250/570, 340/149 R, 340/146.3 ED

[51] Int. Cl..... G06k 5/00, G11b 11/08, G06k 7/10, G06k 15/18

[58] Field of Search...235/61.11 E, 61.12 R, 61.1 R, 235/61.6 A, 61.7 R, 61.11 D, 61.6; 35/9 R, 9 B; 324/73 R; 340/172.5, 146.3 ED, 146.3 Y, 149 R; 250/219 D

[56] References Cited

UNITED STATES PATENTS

| | | | |
|---|---|---|---|
| 2,482,242 | 9/1949 | Brustman | 250/219 D |
| 2,783,454 | 2/1957 | North | 340/149 R |
| 2,820,907 | 1/1958 | Silverman | 250/219 D |
| 3,036,291 | 5/1962 | Whittle | 340/172.5 |
| 3,156,894 | 11/1964 | Greanias | 340/146.3 ED |
| 3,191,006 | 6/1965 | Avakian | 235/61.7 R |
| 3,237,100 | 2/1966 | Chalfin | 324/73 R |
| 3,271,738 | 9/1966 | Kamentsky | 340/146.3 ED |
| 3,283,303 | 11/1966 | Cerf | 340/146.3 Y |
| 3,332,071 | 7/1967 | Goldman | 340/172.5 |
| 3,430,057 | 2/1969 | Genahr | 250/219 D |
| 3,578,953 | 5/1971 | Milford | 235/61.11 R |

*Primary Examiner*—Daryl W. Cook
*Assistant Examiner*—Robert M. Kilgore
*Attorney, Agent, or Firm*—R. S. Sciascia; C. E. Vautrain, Jr.

[57] ABSTRACT

A viewer-encoder which performs the function of an input-output terminal device operating in conjunction with a digital computer is provided. Visual information is presented to a viewer simultaneously with presentation of information in digital form to a computer. A stepper motor is used as a bi-directional incremental drive motor for the film projector.

1 Claim, 5 Drawing Figures

FILM VIEWER DISPLAY ENCODER

The present invention concerns communications between man and computer and, more particularly, a method of and means for simultaneously providing visual information to a viewer and information in digital form to a computer.

In the field of computer operation, it is often desired that the command or other form of information given to the computer be also available in visual form to a person concerned with the particular operation. Previous devices for performing this operation are the cathode ray tube and the typewriter. Cathode ray tubes and their appropriate interface equipment for use with the computer are both expensive and complicated to use, while the typewriter can present only printed descriptions of the commands being given to the computer. The foregoing and other previously used means for communicating between man and computer are limited by word description or by expensive and complicated equipment and, in any event, may not present a variety of types of descriptions such as graphs, alpha-numeric information, diagrams and other forms which can be photographed. The present invention overcomes the deficiencies of the prior art and provides an economical method of and means for presenting a variety of visual information to a viewer while simultaneously providing information in digital form to a computer.

The invention embodies the presentation of digital and visual information on film in an arrangement whereby the visual information is separated from the digital information so that a viewer may be shown a projection of the visual information while the computer reads directly the digital information. The device uses, but is not limited to, a stepper motor as a bi-direction incremental drive motor for the film projector. The digital information on the film is sensed by an array of photodiodes which generate digital signals for the computer.

Accordingly, it is an object of the present invention to provide an economical method of and means for supplying visual information to a viewer while simultaneously supplying information in digital form to a computer.

It is another object of the invention to provide a method of and means for controlling the operation of a computer through an input-output terminal device which is operated in conjunction with the computer and which offers increased flexibility of information presentation at low cost.

A further object of the invention is to provide a film viewer display encoder which affords an optimum in man-machine communication by presenting information on a single element which both the viewer and the computer may read simultaneously.

Other objects, advantages and novel features of the invention will become apparent from the following detailed description thereof when considered in conjunction with the accompanying drawings in which like numerals represent like parts throughout and wherein.

Figure 1:
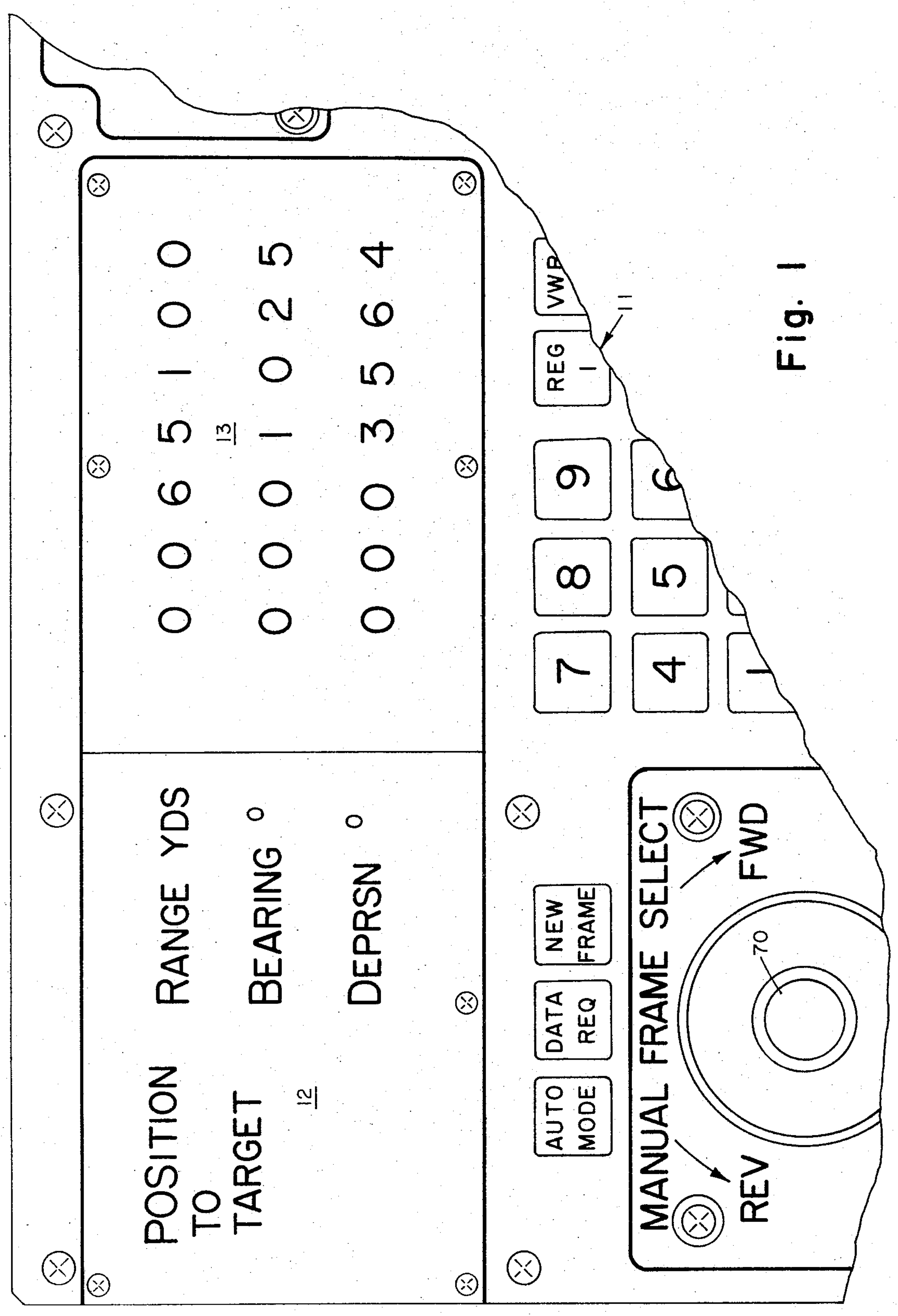
FIG. 1 is a front view of a computer display panel showing the area in which a visual display is presented.

Referring to FIG. 1, a computer display panel (CDP) 11 is shown having a viewer information display area 12 adjacent to an area 13 in which the computer response to encoder information is presented.

Figures 2, 4, 5:
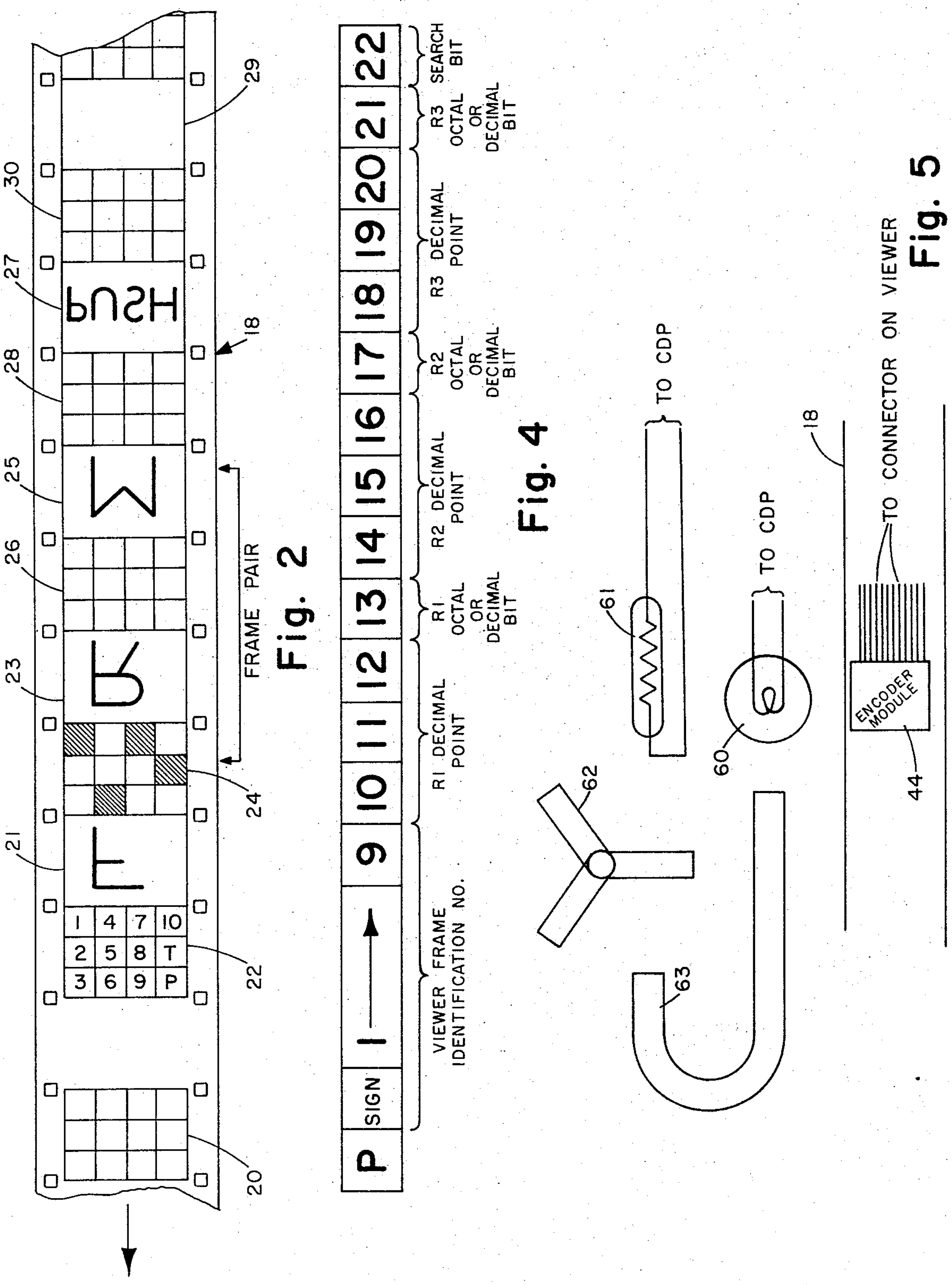
FIG. 2 is a plan view of a strip of film containing visual and encoder information.
FIG. 4 is a schematic diagram of the format for the serial output word from the computer.
FIG. 5 is a schematic diagram of a portion of the film viewer display encoder circuitry.

FIG. 2 illustrates a portion of a film strip 18 having formed therein a plurality of sections presenting digital and visual information. Sections 20, 22, 24, 26 etc., contain digital information in the form of a matrix of 12 light or dark squares while sections 21, 23, 25, 27 etc., contain the associated visual information. In the embodiment shown, section 20 is the first information frame and is succeeded after a space equivalent to two sections by information in visual form. The blank space between sections 20 and 22 is included to provide for a sequence of information thereafter wherein each encoder frame is separated by one section from adjacent encoder frames and by two sections from its succeeding visual frame. In each matrix, the No. 1 square is the most significant bit in the 10-bit word and the No. 10 square is the least significant bit in the 10-bit word.

Figure 3:
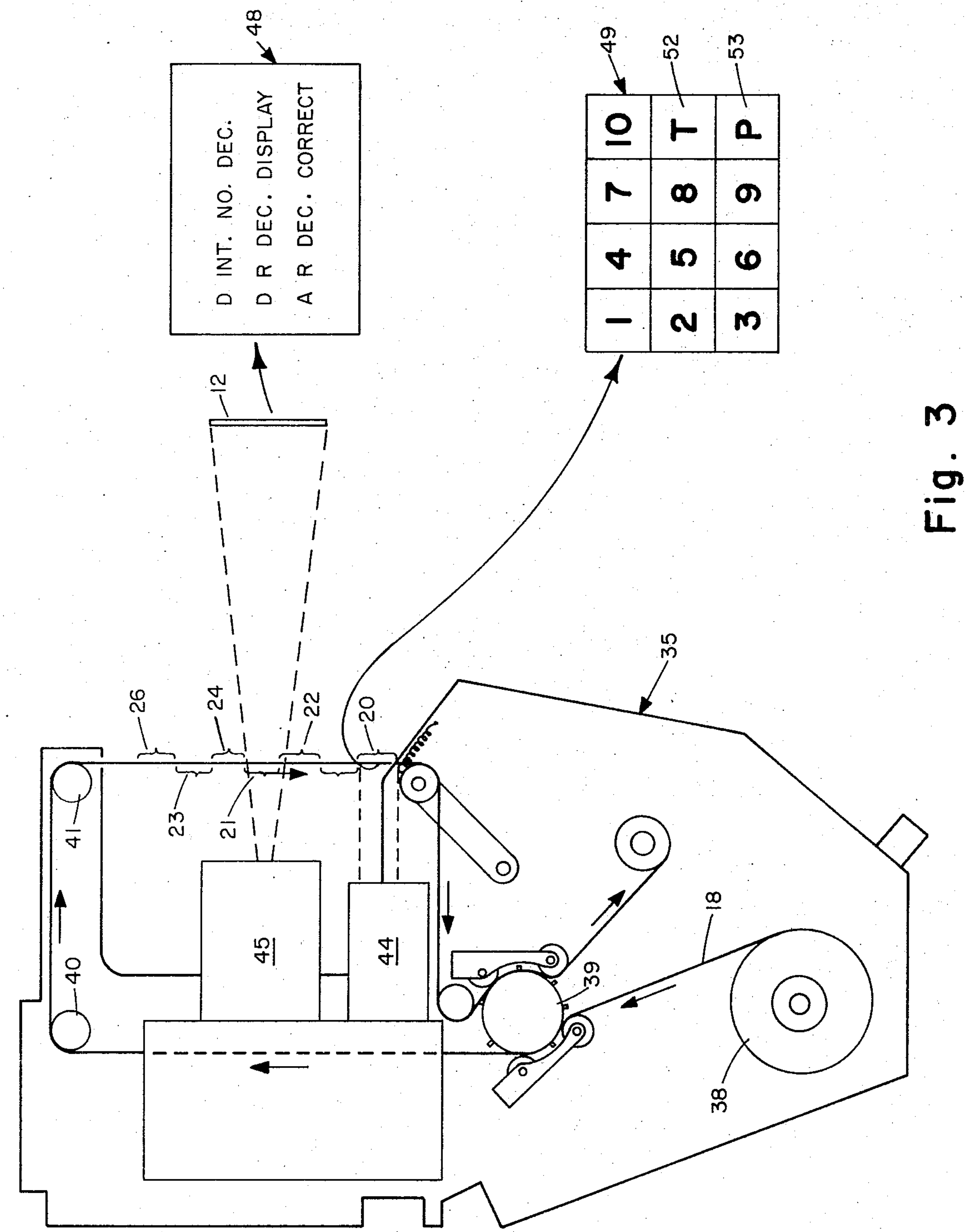
FIG. 3 is a schematic diagram of a film viewer display encoder illustrating the manner in which visual encoder information are presented.

FIG. 3 illustrates one manner in which film 18 may be deployed through a film viewer display encoder 35 to present the information simultaneously to the viewer and to the computer. Film 18 is contained on a supply reel 38 and is fed around a sprocket wheel 39 and rollers 40 and 41 in the direction indicated to position sections 20, 21, 22, 23, etc., of the film opposite an encoder module 44 and a lens assembly 45, respectively. At the moment the view is observed, the film has been stopped by a stepper motor, not shown, with encoder 20 and its related visual section 21 presented in enlarged form to the right of the film viewer display encoder. Section 21 is shown enlarged at 48 to indicate the kind of information that may be requested from the computer. Encoder section 20 is presented in enlarged form at 49 and indicates the digital form of data presented by the viewer. Sprocket wheel 39 preferably is driven by a geneva star wheel and cam which is driven by a stepper motor, not shown, to provide bi-directional, incremental drive for film 18. Film 18 can traverse the viewing and encoder device in either a forward or backward direction and is efficiently stopped at the appropriate instance opposite respective photodiode and visual projection means by the stepping motor.

FIG. 4 illustrates the manner in which the computer display panel logic compares the frame number from the computer with the frame number under the photocell pickup. The format of the encoder frame in the present embodiment of the invention utilizes control letters P (Parity), T (Tape) and discretes 1 through 10 as the view frame identification number, with a possible 1,024 combinations of the ten digits remaining after the letters P and T in the digital matrices in FIG. 2 have been reserved for, respectively, a parity check on whether the computer is reading the proper information, i.e., a validation of the computer, and an indication of whether the recorder tape is to be played. The serial output word identified in FIG. 4 is "R1W."

FIG. 5 illustrates the use of a single encoder lamp 60 as a light source for selectively energizing the twelve photodiodes of encoder module 44. A strobe photodiode 61 tells the computer whether film 18 is at rest or in motion and a fiber optic light pipe 63 conducts light from encoder lamp 60 and directs it toward photodiode 61.

One embodiment of a film display viewer encoder made according to the present invention includes a small 16mm film projector adapted for mounting behind panel 12 and projecting a 3 × 4 inch rear projection onto screen 13. The projector drive is constructed to transport film 18 in either direction and at any rate up to 24 frame pairs per second. Each frame pair consists of a visual frame 20, 22 etc., and an associated encoder frame 21, 23 etc.

The encoder frame contains a matrix of the 12 light or dark squares on the film shown in FIG. 2 at 20, 22, 24 etc., which are readout by encoder module 44 which contains twelve photodiodes. During film transport, a shutter, not shown, cuts off the projected image to prevent visual presentation of the encoder frames on viewing screen 13. The viewing screen and the encoder film frames preferably are illuminated by separate projection lamps. Light from encoder lamp 60 is conducted by means of the fiber-optic bundle of light pipes 63 to a conventional strobe photodiode 61. Shutter 62 is driven directly by a stepper motor, not shown, and interrupts the light to strobe photodiode 61 in synchronism with film advance. The interruptions create a strobe signal indicating when the film is stationary in the projection gate.

The projector used preferably is housed in a pressure-tight case having a relief valve set to limit differential case pressure to no more than ±2.5 psi. All electrical connections preferably are made through a single, environmentally sealed connector on the front of the unit. The film viewer of the present invention is adapted to be operated in conjunction with external control electronics which include the stepper motor control for the film drive and an amplifier required for the photodiodes. The projector used in this embodiment of the invention preferably will accept 16mm double perforated polyester base film 55 ft. in length. Other lengths may be adopted as desired, however, the length specified is preferred since it is sufficient to contain 1,000 usable frame pairs. Care is taken to insure that there is sufficient contrast in the film within the encoder frames to permit reliable data readout. The first and last encoder frames preferably contain data readout information signifying the beginning and end of the film respectively. The ten enumerated squares in sections 20, 22, etc., give film frame identification to the computer which sends out the ten bit "word" serially to the logic in the computer display panel. The logic compares the output of the encoder frame to see if it corresponds to the visual frame and if it does, stops the viewer at which point information is presented in the form shown in area 13 in FIG. 1. If the comparison is incorrect, the logic tells which direction to search for the correct frame. It will be appreciated that the foregoing represents only one mode of operation of the computer in using the invention.

The stepper motor is operated by the computer logic and rotates a selected number of degrees for each logic impulse transmitted to it. Although a geneva star wheel and cam are used to advance film 18 through the viewer, the stepper motor is added to this conventional way of transporting film in order to drive the entire mechanism under the control of the computer logic. Fiber optics are preferred to relay control information to produce the strobe signal. The format of the encoder frame utilizes discretes 1 through 10 as the view frame identification number with 1,024 frames possible. Discrete 11 identifies the frame as a load tape frame, 1 = tape, 0 = no tape, and is sent to the magnetic tape control logic only. Discrete 12 is an odd parity check intended solely as a check of communication between the photodiode pickup and the CDP logic and is not sent to the computer.

Among uses of the view frame projected on the screen are identification of the contents and units of data outputted to a three-register display on the computer, identification of the contents and units the data to be entered by the operator into the registers, information for the operator of an alarm or error condition or a request for some action by the operator, and a request to the computer to turn on a digital magnetic tape recorder and thus perform the read or write function of the tape recorder with the computer.

Either the operator or the computer can control the motion of the film depending on whether a manual or automatic switch lamp on the CDP is lighted. A slewing knob 70 in FIG. 1 may be located directly under the viewer to control the manual motion of the film. Rotation of the knob clockwise causes the film to move forward while rotation of the knob counter-clockwise causes the film to move in reverse resulting in increasing or decreasing frame numbers, respectively. Film speed can be increased as the knob is rotated further from the center or null position. The knob preferably is spring loaded to return to the center position when released.

In an automatic mode of operation of the invention, the computer outputs serially to the computer display panel a word which contains the frame identification number and a tag bit indicating that an automatic search is desired. The CDP logic compares the frame number from the computer with the frame number under the photocell pickup and moves the film one frame pair at a time in either the forward or reverse direction. Each time the film is moved a new comparison is made and a new motion command given until the desired frame is found. When the film viewer is under manual control, the computer can be programmed to flash an auto switch on the CDP indicating that it wishes to gain control of the viewer.

What is claimed is:

1. A device for controlling the operation of a computer having a display panel comprising:

strip film means containing spaced segments of visual information and related digital control information;

means for simultaneously displaying said visual information to a viewer and said digital control information to the computer logic, said means for displaying including a film viewer display encoder positioned behind said computer display panel so as to project a rear projection of said visual information thereon, said encoder including an encoder lamp for projecting said control information, a photosensitive means for reading said visual information and means for conveying said control information to the computer logic;

a photodiode in said encoder, a fiber optic bundle having one end disposed opposite said photodiode, and a shutter interposed between the other end of said bundle of light pipes and said photodiode for selectively interrupting the light impinging on said photodiode; and a stepper motor for driving said film means bidirectionally in increments, said shutter driven by said stepper motor so as to interrupt the light of said photodiode in synchromium with film advance, said control information presented in a matrix of discrete squares at least two of which are reserved one for an odd parity check and the other as a tape check, said computer logic adapted to compare the output of said photosensitive means to said visual information and, if the two correspond, to stop said encoder and present the related computer data to the viewer in said computer display panel opposite said visual information.

* * * * *